(12) United States Patent
Jones et al.

(10) Patent No.: US 7,962,749 B2
(45) Date of Patent: Jun. 14, 2011

(54) METHOD AND SYSTEM FOR CREATING A NON-REPUDIABLE CHAT LOG

(75) Inventors: Daniel Horacio Jones, Round Rock, TX (US); Thomas Girard Lendacky, Austin, TX (US); Emily Jane Ratliff, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1283 days.

(21) Appl. No.: 11/539,791

(22) Filed: Oct. 9, 2006

(65) Prior Publication Data

US 2008/0086317 A1    Apr. 10, 2008

(51) Int. Cl.
*H04L 9/32* (2006.01)
*G06F 3/023* (2006.01)

(52) U.S. Cl. .......................... 713/170; 713/168; 715/758

(58) Field of Classification Search .................. 713/168, 713/170, 176, 181; 709/204; 715/752, 753, 715/758

See application file for complete search history.

(56) References Cited

U.S. PATENT DOCUMENTS

| 2002/0023221 A1* | 2/2002 | Miyazaki et al. ............. 713/178 |
| 2005/0216736 A1* | 9/2005 | Smith ........................... 713/168 |

OTHER PUBLICATIONS

"GT: Evidence Instant Messenger™", http://www.secstan.co.uk/datasheets/july_2004/GT%20Instant%20Messenger.pdf, security & standards, Sep. 7, 2004, 2 pages.

Mohan, "Emerging Security Technologies", http://www.securesynergy.com/library/articles/2004/0011.php, May 20, 2004, pp. 1-5.

* cited by examiner

*Primary Examiner* — Taghi T Arani
*Assistant Examiner* — Justin T Darrow
(74) *Attorney, Agent, or Firm* — Yee & Associates, P.C.; Justin M. Dillon

(57) ABSTRACT

A system for creating a non-reputable chat log. An initial quote is performed of a value of a register in response to a secure chat session being initiated. The value of the register is extended to record a message measurement within the register for the secure chat session in response to a message being measured. A final quote is performed of the value of the register in response to the secure chat session being terminated.

17 Claims, 3 Drawing Sheets

METHOD AND SYSTEM FOR CREATING A NON-REPUDIABLE CHAT LOG

BACKGROUND OF THE INVENTION

1. Field of the Invention

The present invention relates generally to an improved data processing system. More specifically, the present invention is directed to a computer implemented method, system, and computer usable program code for creating a non-repudiable chat log.

2. Description of the Related Art

Today, most computers are connected to some type of network. A network allows a computer to share information with other computer systems. The Internet is one example of a computer network. There is no doubt that the Internet has changed the way people and businesses communicate. Instant messaging (IM) is a type of computer application that is designed to facilitate communication among multiple computer users attached to a network, such as, the Internet.

Instant messaging may be implemented in various ways, but in general instant messaging supports the sending and receiving of instant messages to and from other users. Instant messages are correspondence that appears on a computer display of a recipient more or less instantaneously after being sent. This is opposed to the more traditional e-mail messages, which typically are logged in a system until a recipient wishes to view them. The ability to receive correspondence almost instantly gives instant messaging a more spontaneous, conversational quality than does traditional e-mail. A variety of users, such as, groups of individuals working closely together on some critical project or more casual users at home wanting to see if someone is available to receive an immediate message, may use instant messaging applications.

Normally, instant messaging involves two people online, sending notes back and forth to each other. Sending an instant message opens up a small window display on each computer interface so that both individuals involved in the process may type in and read messages. A "chat room" is a software program that allows a group of people to communicate with each other by allowing each member of the group to type in messages that are seen by everyone in the chat room. An instant messaging system generally comprises a plurality of instant messaging client devices coupled to an instant messaging server via a data processing system network. Messages and connection information is maintained on the server that is controlled by a provider of the instant messaging service. Examples of instant messaging services are Lotus® Sametime®, Microsoft® Network (MSN®) Messenger, Sun™ONE Instant Messenger, AOL® Instant Messenger (AIM®), and Yahoo! Messenger™.

Unfortunately, criminals are taking advantage of this instant messaging technology to perpetrate cyber crime, such as, for example, sexual predators looking for minor victims online and online "phishing" scams. The term phishing alludes to the use of increasingly sophisticated online lures to "fish" for users' financial information, passwords, and other sensitive personal information. Since cyber crime is quickly maturing, law enforcement officials are actively seeking to prosecute these types of criminals. When evidence of a crime takes place during an online "chat session," prosecutors may introduce the "chat log" of that chat session as evidence in a court of law against the alleged criminal.

A chat session is one entire online instant messaging conversation between individuals or a group of individuals over a period of time. A chat log is a record of that entire chat session, which includes, for example, the date, time, and text of all sent and received messages, along with the screen name of the sender. However, currently the value of a chat log as evidence of criminal activity in a court of law depends on the reputation of the law enforcement officer that engaged in that particular chat session. This chat log evidence will be given greater weight in court if it can be shown that no one had an opportunity to tamper with the chat log prior to the prosecutor presenting the chat log as evidence at trial.

Therefore, it would be beneficial to have a computer implemented method, apparatus, and computer usable program code for creating a non-repudiable chat log that greatly decreases any question of tampering and increases credibility of the gathered evidence.

SUMMARY OF THE INVENTION

Illustrative embodiments provide a computer implemented method, system, and computer usable program code for creating a non-repudiable chat log. An initial quote is performed of a value of a register in response to a secure chat session being initiated. The value of the register is extended to record a message measurement within the register for the secure chat session in response to a message being measured. A final quote is performed of the value of the register in response to the secure chat session being terminated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
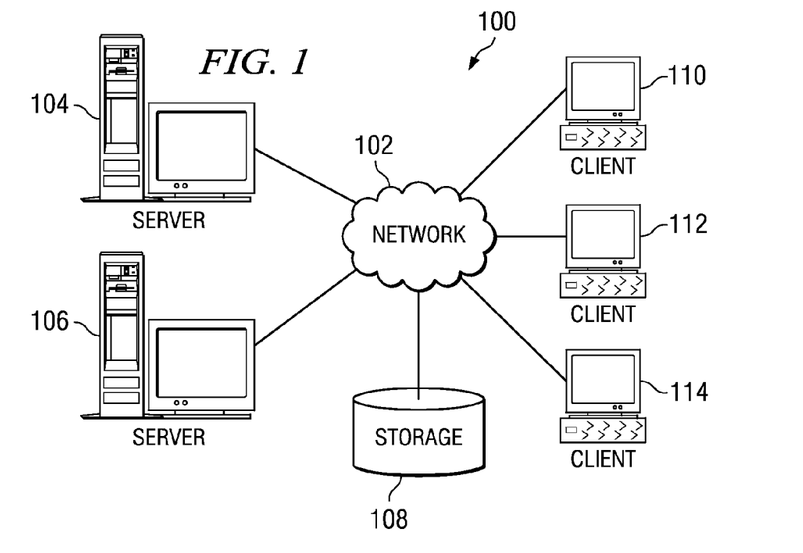
FIG. 1 is a pictorial representation of a network of data processing systems in which illustrative embodiments may be implemented.
Figure 2:
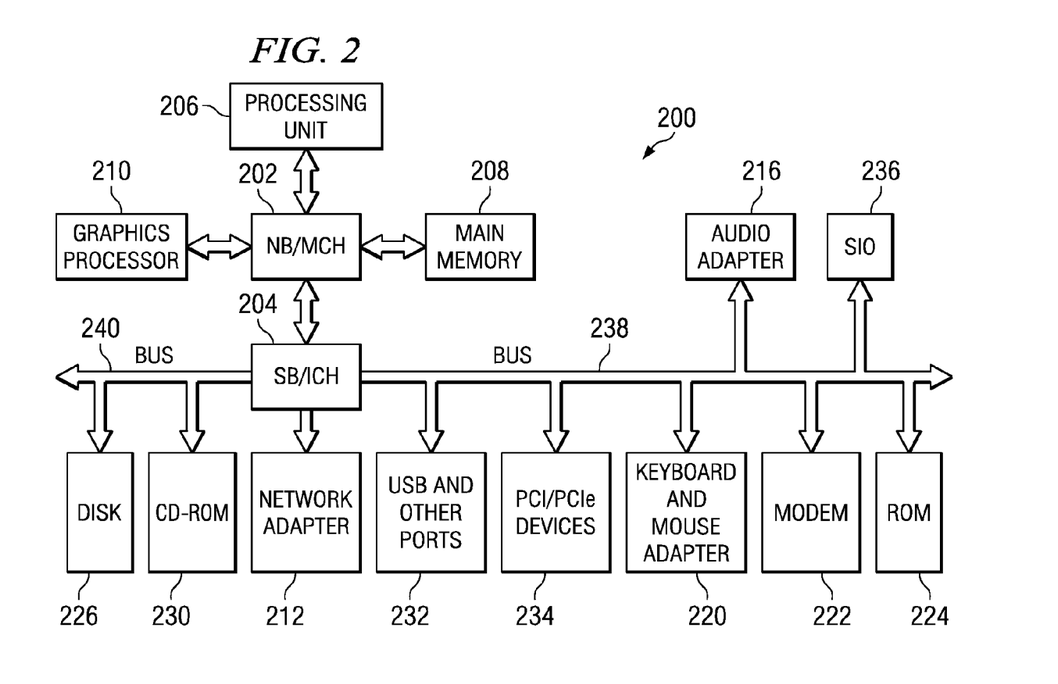
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processor 206. The processes of illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide a computer implemented method, system, and computer usable program code for creating a reputable chat log. In response to a user or an instant messaging application initiating a secure instant messaging chat session on an instant messaging client device, the instant messaging application performs an initial quote of a value of a platform configuration register that resides in a trusted platform module within the instant messaging client device. Then, the instant messaging application measures each incoming instant message or outgoing instant message in the secure chat session and extends the value of the platform configuration register in order to create a sequenced measurement of the entire online conversation. In addition, the instant messaging application may perform intermediate quotes of the platform configuration register during the secure instant messaging chat session. The intermediate platform configuration register value quotes provide illustrative embodiments with the ability to verify the validity of a subset, or subsets, of the secure chat session either during the secure chat session or after the secure chat session is ended.

In response to the user terminating the secure instant messaging chat session, the instant messaging application performs a final quote of the value of the platform configuration register. Then, the instant messaging application may verify that each platform configuration register value quote is signed by the trusted platform module using a valid attestation identity key and re-measure the entire recorded chat log to compare with the platform configuration register value quotes to determine if tampering or modification of the chat log occurred. Alternatively, an independent software application may perform the verification process. Further, the verification process may be performed by a different instant messaging client device or other data processing system.

Using illustrative embodiments an entity, such as, for example, an individual, law enforcement agency, government agency, academic institution, research institution, and business, may trust that the chat log of the secure instant messaging chat session has not been tampered with or modified during the chat session or after the chat session is ended. Also, the entity using illustrative embodiments may provide the reputable chat log to, for example, all the participants of the chat session, other individuals within the entity, or other third party, to unquestionably demonstrate exactly what was stated online during the chat session.

Figure 3:
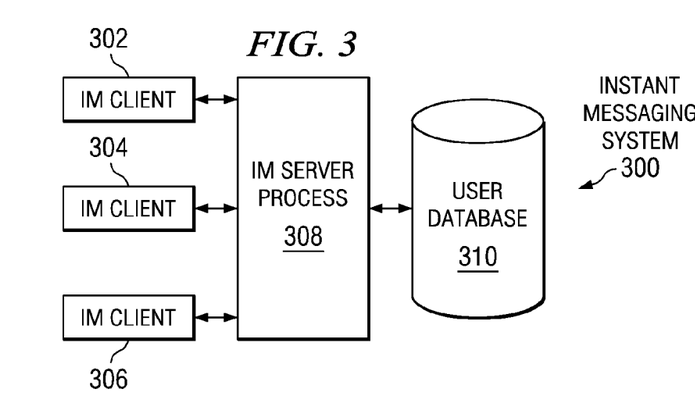
FIG. 3 is an exemplary block diagram illustrating components used in managing instant messages in accordance with illustrative embodiments.

With reference now to FIG. 3, an exemplary block diagram illustrating components used in managing instant messages is depicted in accordance with illustrative embodiments. Instant messaging system 300 may, for example, include instant messaging clients 302, 304, and 306, instant messaging server process 308, and user database 310. However, it should be noted that FIG. 3 is only intended for the purpose of illustration and does not imply any architectural limitations on illustrative embodiments. Illustrative embodiments may include any components necessary to accomplish the task of creating a reputable chat log.

In the illustrative example of FIG. 3, a user utilizing instant messaging client 302 may exchange instant messages over a network with other users utilizing instant messaging client 304 and/or instant messaging client 306. For example, client 110 may exchange messages over network 102 with client 112 and/or client 114 in FIG. 1. The exchanging of messages may, for example, be via instant messaging, broadcast messaging, or any other synchronous messaging system that may be utilized by illustrative embodiments. Broadcast messaging provides a means for instantaneously sending a single message to all members of a predefined community of instant messaging clients.

Instant messaging clients 302, 304, and 306 may be executing on a data processing system, such as, for example, data processing system 200 in FIG. 2. It should be noted that even though the exemplary illustration of FIG. 3 depicts three instant messaging clients, illustrative embodiments are not restricted to such. For example, an entity using processes of illustrative embodiments may employ fewer or more instant messaging clients as necessary to complete the mission of the entity.

Instant messaging server process 308 may be located in a server, such as, for example, server 104 in FIG. 1. In addition, instant messaging server process 308 may be executing on a data processing system, such as, for example, data processing system 200 in FIG. 2. Instant messaging server process 308 facilitates the process of instant messaging by allowing the user of instant messaging client 302 to find the user of instant messaging client 304 and/or the user of instant messaging client 306 within instant messaging system 300, as well as, aiding in the exchange of instant messages between the different users of instant messaging clients 302, 304, and 306. Depending on the implementation of instant messaging system 300, instant messaging server process 308 may, for example, only provide an indication of when users of instant messaging clients 302, 304, and 306 are currently online and establish initial contacts.

User database 310 stores user data. In this illustrative example, instant messaging system 300 utilizes user database 310 to store data regarding registration information for the different users of instant messaging clients 302, 304, and 306. Instant messaging server process 308 may, for example, use this stored registration information within user database 310 to search for and find currently online users of instant messaging clients 302, 304, and 306, as well as other users that are currently online, to facilitate the exchange of instant messages.

Figure 4:
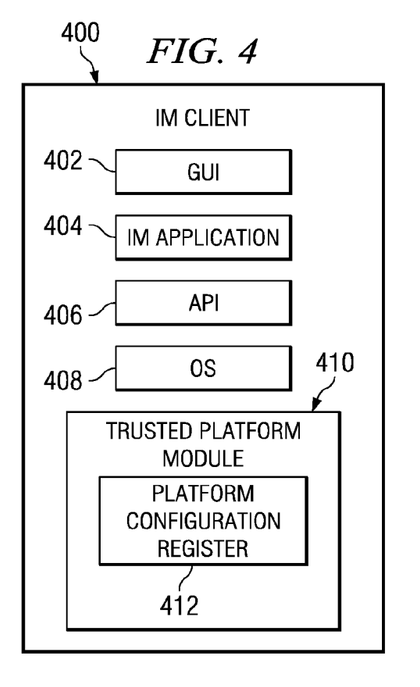
FIG. 4 is an exemplary block diagram illustrating components of an instant messaging client device in accordance with illustrative embodiments.

With reference now FIG. 4, an exemplary block diagram illustrating components of an instant messaging client device is depicted in accordance with illustrative embodiments. A user utilizes instant messaging client 400 to exchange instant messages with other users currently online within an instant messaging system, such as, for example, instant messaging system 300 in FIG. 3. Instant messaging client 400 may, for example, be instant messaging client 302 in FIG. 3. Instant messaging client 400 includes graphical user interface (GUI) 402, instant messaging application 404, application programming interface (API) 406, operating system (OS) 408, trusted platform module (TPM) 410, and platform configuration register (PCR) 412. However, it should be noted that FIG. 4 is only shown for illustration purposes and is not meant as a limitation on illustrative embodiments. Illustrative embodiments may include any hardware, software, and/or firmware components necessary to accomplish the task of creating a reputable chat log. Also, it should be noted that illustrative embodiments may reside in one or more instant messaging client devices connected to the instant messaging system, such as instant messaging clients 302, 304, and 306 connected with instant messaging system 300 in FIG. 3.

A user of instant messaging client 400 utilizes graphical user interface 402 to interact with applications residing in instant messaging client 400, such as, for example, instant messaging application 404. A graphical user interface is a graphics-based user interface that incorporates movable windows and icons, which may be manipulated by a mouse or a keyboard. Typically, a graphical user interface is the standard way a user interacts with a computer.

The user employs instant messaging application 404 to connect to and access an instant messaging server over the network. For example, instant messaging client 302 utilizes an instant messaging application to access instant messaging server process 308 in FIG. 3. Instant messaging application 404 may be any instant messaging application that illustrative embodiments may utilize to access an instant messaging server.

Application programming interface 406 allows the user of instant messaging client 400, which may be an individual or a software routine, to invoke system capabilities using a standard consistent interface without concern for how the particular functionality is implemented.

Instant messaging application 404 may, for example, run on operating system 408. Instant messaging application 404 represents any number of software applications designed to react to data to provide the desired functionality the user seeks. The software applications represented by instant messaging application 404 may include those software applications necessary to handle data, video, graphics, photos, and/or text.

Instant messaging application 404 may, for example, measure each incoming and outgoing instant message after a user manually initiates a secure instant messaging chat session within instant messaging application 404. Alternatively, instant messaging application 404 may automatically initiate a secure instant messaging chat session for every instant messaging session unless otherwise instructed by the user. A secure instant messaging chat session, according to this illustrative embodiment, is an instant messaging chat session that requires platform configuration register 412 to record a sequenced measurement of each incoming and outgoing instant message within platform configuration register 412. Instant messaging application 404 uses the recorded sequenced measurement of each incoming and outgoing instant message within platform configuration register 412 to verify that a non-repudiable chat log of the entire instant messaging chat session has been created. A non-repudiable, or reputable, chat log is a chat log that is free from any question of tampering or modification by an individual either during the instant messaging chat session or after the instant messaging chat session is terminated. The chat log records the entire chat session, which includes, for example, the date, time, and text of all sent and received instant messages, along with the screen name of the sender of the instant message. However, it should be noted that illustrative embodiments are not restricted to the above-listed items in a chat log. Illustrative embodiments may include any data necessary in the chat log to accomplish processes of illustrative embodiments.

Instant messaging application 404 extends the current value of platform configuration register 412 in order to record each incoming and outgoing instant message measurement to form the sequenced measurement of the entire secure chat session. Furthermore, instant messaging application 404 makes calls to periodically "quote" the current value of platform configuration register 412 for future comparison and verification purposes. For example, instant messaging application 404 makes a call to quote the current value of platform configuration register 412 at the start of the secure chat session, at the end of the secure chat session, and at predetermined intervals between the start and end of the secure chat session. Of course it should be noted that instant messaging application 404 may automatically make calls to periodically quote the current value of platform configuration register 412 at predetermined times or a user of instant messaging client 400 may manually instruct instant messaging application 404 to make a call to quote the current value of platform configuration register 412 at any time. A quote is information on, or a record of, the value of platform configuration register 412 at the time instant messaging application 404 makes a call to perform the quote.

Operating system 408 is utilized to provide high-level functionality to the user and to other software. Such an operating system typically includes a basic input output system. Operating system 408 and instant messaging application 404 may employ user input devices in order to obtain input from the user. User input devices may, for example, include a mouse, a keyboard, or any other input device known to those of ordinary skill in the art. A user may utilize the user input devices to type instant messages in a text box and set user preferences in a preference window displayed on graphical user interface 402.

A processor, such as, for example, processor 206 in FIG. 2, performs the basic operations in instant messaging client 400. The processor may, for example, display information on graphical user interface 402. Graphical user interface 402 has a plurality of picture elements, collectively referred to as a screen, which may define the appearance of a user interface environment displayed on graphical user interface 402. Graphical user interface 402 screen contents and, therefore, the appearance of the user interface environment, may be controlled or altered by instant messaging application 404 and/or operating system 408.

Trusted platform module 410 resides on a motherboard that is contained within instant messaging client 400. Trusted platform module 410 is a microcontroller, or integrated circuit, that stores secured data and conforms to the trusted platform module specification put forward by the Trusted Computing Group (TCG). Trusted computing is a technology developed and promoted by the Trusted Computing Group. Trusted means that the system may be trusted more fully to follow the system's intended programming with a lower possibility of inappropriate activity occurring.

However, it should be noted that illustrative embodiments are not restricted to trusted platform module 410 residing on the motherboard. For example, illustrative embodiments may use a software application to create trusted platform module 410 as a virtual trusted platform module that does not require any hardware component. Alternatively, illustrative embodiments may utilize a combination of hardware and software components to create trusted platform module 410.

Trusted platform module 410 provides an environment for protected cryptographic functions to execute without modification or exposing cryptographic key information. Trusted platform module 410 also attests to the current status of both trusted platform module 410 and the platform on which trusted platform module 410 resides, which is instant messaging client 400. Trusted platform module 410 may, for example, protect secrets within instant messaging client 400, perform cryptographic functions, create, store, and manage cryptographic keys, provide a unique endorsement key, perform digital signature operations, and hold instant messaging client 400 measurements.

Platform configuration register 412 resides within trusted platform module 410. Trusted platform module 410 holds platform configuration register 412 in volatile storage within trusted platform module 410. A register is a small high-speed circuit that is used as a storage location to hold values of internal operations and data being processed. Platform configuration register 412 represents a plurality of platform configuration registers.

Platform configuration register 412 may, for example, store platform integrity measurements for instant messaging client 400 in a way that prevents misrepresentation. Platform configuration register values play an important role in several trusted platform module 410 functions, such as, for example, sealed storage, attestation, and platform boot. During boot of instant messaging client 400, trusted platform module 410 gathers measurements about the running environment. Trusted platform module 410 performs a hash, logs the data, and extends the value of an appropriate platform configuration register to record the gathered measurement data about the running environment.

In cryptography, a one-way hash function, such as, for example, secure hash algorithm-1 (SHA-1), is an algorithm that generates a fixed string of numbers from a test message. "One-way" means that it is extremely difficult to turn the fixed string back into the text message. A one-way hash function is used for creating digital signatures for message authentication. A digital signature is a digital guarantee that information or data has not been tampered with or modified. The digital signature acts as if the information is protected by a tamper-proof seal that is broken only if the content is altered. A remote entity may decide whether to trust instant messaging client 400 based on the platform configuration register values.

Changes to the computing environment of instant messaging client 400 requires updates to the platform configuration registers. The value of a platform configuration register may be changed in one of two ways: reset or extend. A chipset limits which platform configuration registers may be reset. When instant messaging application 404 extends the value of platform configuration register 412, platform configuration register 412 does not loose its previous context. Extending the value of platform configuration register 412 simulates an infinite log or a series of measurements. The new platform configuration register 412 value hash is computed over the concatenation of the old platform configuration register 412 value and the value to add.

Presently, a large number of computers are manufactured with trusted platform modules integrated onto the computers' motherboard. This Trusted Computing Group technology may be used, for example, to verify the integrity of evidence collected by law enforcement personnel while conducting online conversations, or instant messaging chat sessions, with suspects. A prosecutor may present the chat logs of these instant messaging chat sessions with suspected criminals as evidence in court of criminal activity or intent. However, the integrity of the chat log data collected currently depends upon the credibility of the law enforcement personnel involved. It has been shown in high profile cases that a judge may not allow even solid evidence, such as DNA matching, if the defense demonstrates that an opportunity existed for the evidence to be corrupted either deliberately or through negligence. The use of a non-repudiable chat log greatly decreases, or eliminates, any question of tampering and, therefore, adds credibility to the gathered chat log data. Illustrative embodiments prevent secure chat log files from being undetectably tampered with during the secure chat session or after the secure chat session has completed by verifying that each platform configuration register value quote is signed by trusted platform module 410 and by re-measuring each recorded incoming and outgoing instant message in the chat log to compare the re-measurement value with the initial, intermediate, and/or final platform configuration register quote values to determine tampering during and after the secure chat session.

At the time instant messaging client 400 is manufactured, the manufacturer creates an Endorsement Key (EK) within trusted platform module 410. The user of instant messaging client 400, which has trusted platform module 410 embedded on the motherboard, requests an attestation identity key (AIK) from a certification authority (CA). A certification authority is an organization that issues digital certificates. In order for the certification authority to grant the attestation identity key, the user of instant messaging client 400 must prove that trusted platform module 410 is the original trusted platform module for instant messaging client 400.

The endorsement key is the root key for establishing the identity of trusted platform module 410 to obtain the attestation identity key from the certification authority. As stated above, the endorsement key is generated only once at the time of manufacture. The user of trusted platform module may enable/disable access to the endorsement key. If the user disables, or wipes out, the endorsement key, the user loses the ability to get an attestation identity key. In addition, the user may set trusted platform module 410 as enabled/disabled, active/inactive, and owned/unowned. In order for instant messaging client 400 to successfully attest to a chat log as being non-repudiable, trusted platform module 410 must be enabled, active and owned.

At the start of a secure instant messaging chat session, instant messaging application 404 automatically requests a quote of the current value of platform configuration register 412. The current value quote of platform configuration register 412 is signed by trusted platform module 410's attestation identity key. Then, instant messaging application 404 measures each incoming instant message received and each outgoing instant message sent during the secure instant messaging chat session and extends the value of platform configuration register 412 in order to record each incoming and outgoing instant message measurement within platform configuration register 412, itself, to form a sequenced measurement of the entire secure chat session.

In addition, instant messaging application 404 may request periodic quotes of the current value of platform configuration register 412 at predetermined intervals during the secure instant messaging chat session as additional check points to verify that subsets of the secure chat session are not modified or tampered with while the secure chat session is in progress. At the end of the secure instant messaging chat session, instant messaging application 404 requests a final quote of the current value of platform configuration register 412. In this manner, instant messaging client 400 maintains a chat log, which includes the entire contents of the secure instant messaging chat session, and a measurement log, which includes measurements of each incoming and outgoing instant message and each platform configuration register 412 value quote. Thus, instant messaging application 404 may verify that the chat log is not altered by re-measuring the measurement log and checking that each quoted platform configuration register 412 value quote is signed by a valid attestation identity key.

The benefit of appending each incoming and outgoing instant message measurement to platform configuration register 412 is that a sequential measurement of the entire secure chat session is produced that is easily compared with the re-measurements of the incoming and outgoing instant messages to determine if tampering occurred either during the secure chat session or after the secure chat session is terminated. In an alternative illustrative embodiment, incoming and outgoing network packets containing instant messages may be measured and logged in a tcpdump format. Tcpdump is widely used and is installed as part of the default tools on many computer systems. In addition, there are many tools that integrate the pcap library, which is able to read tcpdump output files. By default, tcpdump puts a network interface, such as, for example, network adapter 212 in FIG. 2, into promiscuous mode to capture every packet going across the network. In this way, almost any instant messaging client device may be utilized to perform this packet measuring and logging function, but the chat log file will be larger and the verification process will take longer because more measurements will need to be verified.

Whichever logging method is chosen, the chat logs are determined to be valid or invalid by starting at the initial platform configuration register 412 value quote, re-measuring every logged instant message in the chat log, calculating a new platform configuration register 412 value for each logged instant message in the chat log until the final message is reached, comparing the final re-measurement value with the final platform configuration register 412 value quote recorded at the end of the chat log, and verifying that the attestation identity key signature on each platform configuration register 412 value quote is valid. If any of the attestation identity key signatures are invalid or the final platform configuration register 412 value quote does not match the final re-measurement value, then the chat log has been tampered with or modified.

Figure 5:
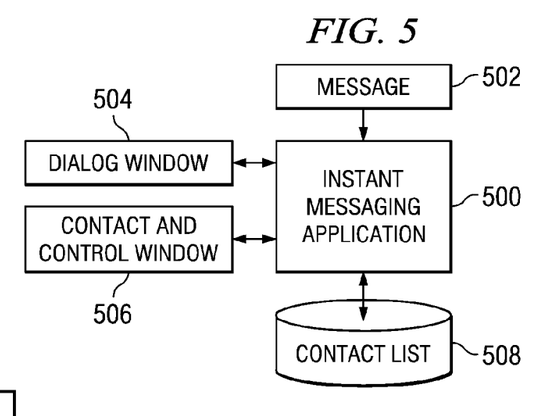
FIG. 5 is an exemplary block diagram illustrating an instant messaging application in accordance with illustrative embodiments.

With reference now to FIG. 5, an exemplary block diagram illustrating an instant messaging application is depicted in accordance with illustrative embodiments. The components shown in FIG. 5 may, for example, be found in an instant messaging application that resides within an instant messaging client, such as, instant messaging application 404 that resides within instant messaging client 400 in FIG. 4. Instant messaging application 500 includes message 502, dialog window 504, contact and control window 506, and contact list 508. However, FIG. 5 is only intended for illustration purposes and is not meant as a limitation on illustrative embodiments. Illustrative embodiments may include more or fewer components to instant messaging application 500 that are necessary to accomplish processes of illustrative embodiments.

Instant messaging application 500 processes message 502. Message 502 may be an incoming instant message or an outgoing instant message. To process message 502, instant messaging application 500 measures message 502, extends a platform configuration register, such as platform configuration register 412 in FIG. 4, to form a sequenced measurement of the secure chat session, and adds message 502 to a chat log.

Further, instant messaging application 500 displays incoming message 502 in dialog window 504 on a GUI, such as GUI 402 in FIG. 4, for the user to read. Additionally, dialog window 504 provides an interface for the user to input text in order to draft outgoing message 502. Then, instant messaging application 500 sends outgoing message 502 over a network, such as network 102 in FIG. 1, to another instant messaging client device utilizing the instant messaging system, such as instant messaging client 306 utilizing instant messaging system 300 in FIG. 3.

Instant messaging application 500 presents contact and control window 506 to provide the user with a contact list of user names, as well as other information. Contact and control window 506 also provides an interface to allow the user to set different preferences. For example, the user may set passwords required to access different names used in instant messaging chat sessions. Additionally, the user may set a preference to link the instant messaging application to another application within the data processing system, such as a security application.

Further, the user may use contact and control window 506 to set other preferences, such as alerts, colors, and fonts used in instant messaging application 500. These preferences also may include whether a picture is to be sent when an instant messaging session is initiated with another user. Depending on the implementation, the preference may be set to allow a user who receives messages to retrieve images of the senders from a remote database, such as user database 310 in FIG. 3, or a local cache.

In addition, contact and control window 506 stores in contact list 508 a list of names presented by contact and control window 506 in these examples. The user may edit contact list 508 by adding to or deleting from contact list 508 other users. Contact list 508 is utilized for presenting the list of names within contact and control window 506.

Figure 6:
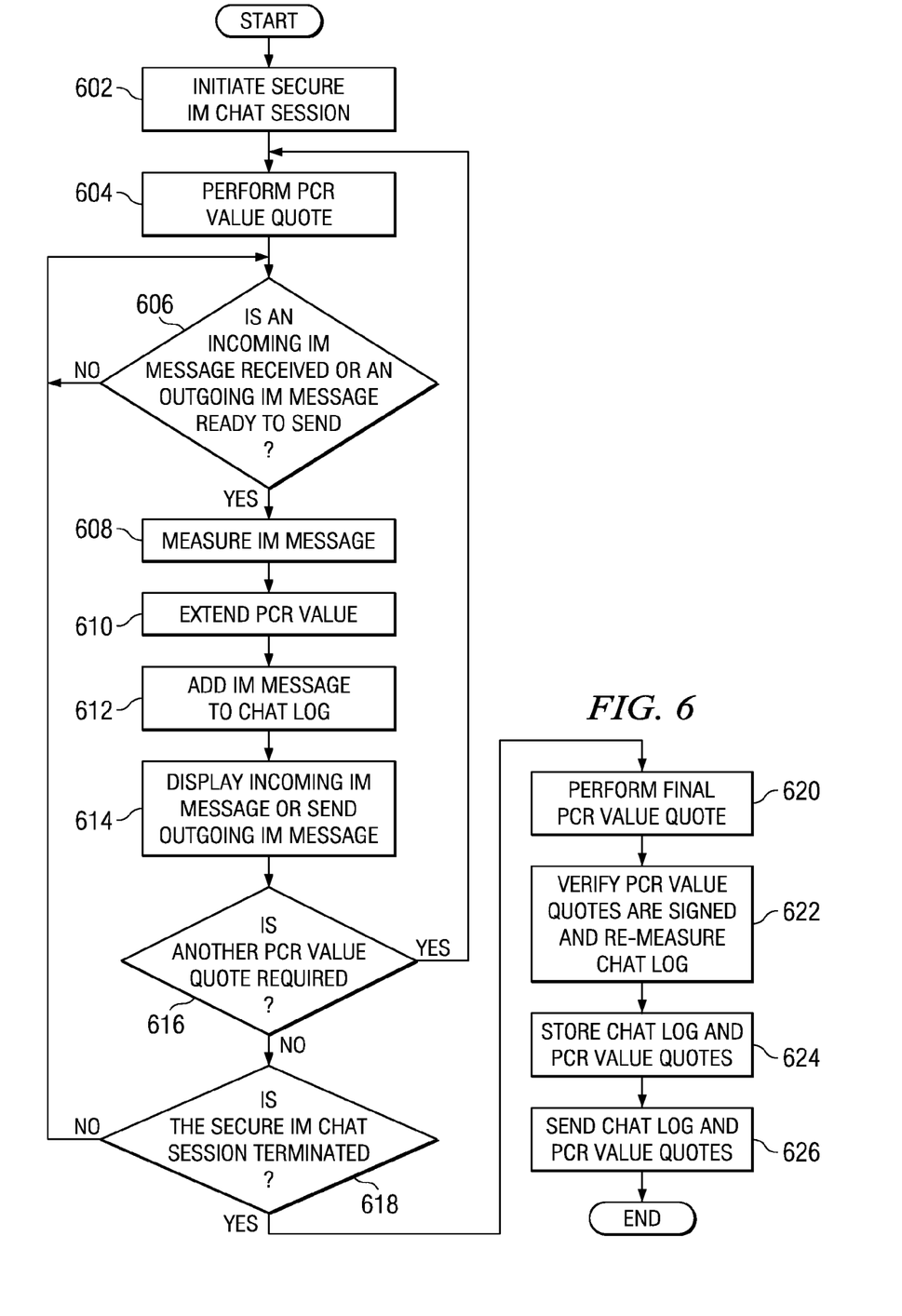
FIG. 6 is a flowchart illustrating an exemplary process for creating a reputable chat log in accordance with illustrative embodiments.

With reference now to FIG. 6, a flowchart illustrating an exemplary process for creating a reputable chat log is shown in accordance with illustrative embodiments. The process shown in FIG. 6 may be implemented in an instant messaging client device, such as, for example, instant messaging client 400 in FIG. 4.

The process begins when an instant messaging application, such as, for example, instant messaging application 404 in FIG. 4, automatically initiates a secure instant messaging chat session for an online instant messaging conversation between a user of the instant messaging client device and another individual or individuals that are online as well. (step 602). Alternatively, the user may manually initiate the secure instant messaging chat session for the online conversation. Subsequent to initiating the secure instant messaging chat session in step 602, the instant messaging application performs an initial quote of the current value of a platform configuration register, such as, for example, platform configuration register 412 in FIG. 4 (step 604).

After performing the initial quote of the current value of a platform configuration register in step 604, the instant messaging application makes a determination as to whether the instant messaging application has received an incoming instant message or is ready to send an outgoing instant message (step 606). If the instant messaging application has not received an incoming instant message or is not ready to send an outgoing instant message, no output of step 606, then the process returns to step 606 where the instant messaging application waits to process an incoming or outgoing instant message. If the instant messaging application has received an incoming instant message or is ready to send an outgoing instant message, yes output of step 606, then the instant messaging application measures the incoming or outgoing instant message (step 608).

Subsequent to measuring the incoming or outgoing instant message in step 608, the instant messaging application extends the current value of the platform configuration register, to record the incoming or outgoing instant message measurement within the platform configuration register to form a sequenced measurement of the secure instant messaging chat session (step 610). After extending the platform configuration value in step 610, the instant messaging application adds the incoming or outgoing instant message to a chat log (step 612). Then, the instant messaging application either displays the incoming instant message in a dialog window, such as, for example, dialog window 504 in FIG. 5, within a GUI, such as, for example, GUI 402 in FIG. 4, on the instant messaging client device for the user to read or sends the outgoing instant message over a network, such as network 102 in FIG. 1, to another instant messaging client device utilizing the instant messaging system, such as instant messaging client 304 utilizing instant messaging system 300 in FIG. 3 (step 614).

Subsequent to displaying the incoming instant message or sending the outgoing instant message in step 614, the instant messaging application makes a determination as to whether the instant messaging application needs to automatically perform another predetermined periodic platform configuration register value quote (step 616). Alternatively, the user may manually instruct the instant messaging application to perform another platform configuration register value quote. If the instant messaging application needs to perform another platform configuration register value quote, yes output of step 616, then the process returns to step 604 where the instant messaging application performs a platform configuration value quote. If the instant messaging application does not need to perform another platform configuration register value quote, no output of step 616, then the instant messaging application makes a determination as to whether the secure instant messaging chat session is terminated (step 618).

If the secure instant messaging chat session is not terminated, no output of step 618, then the process returns to step 606 where the instant messaging application waits to process another incoming or outgoing instant message. If the secure instant messaging chat session is terminated, yes output of step 618, then the instant messaging application performs a final platform configuration register value quote (step 620). After performing the final platform configuration register value quote in step 620, the instant messaging application verifies that each platform configuration register value quote is signed by a valid attestation identity key and re-measures the chat log entries to compare with the quoted values to determine tampering or modification of the chat log (step 622).

Subsequent to verifying the platform configuration values are signed and re-measuring the chat log to determine tampering in step 622, the instant messaging application automatically stores the non-repudiable chat log of the secure instant messaging chat session and the platform configuration value quotes in a non-volatile storage device, such as, for example, read only memory 224, hard disk 226, or compact disc—read only memory 230 in FIG. 2, or storage 108 in FIG. 1 (step 624). Alternatively, the user may manually direct the instant messaging application to store the non-repudiable chat log of the secure instant messaging chat session and the platform configuration value quotes in a non-volatile storage device, such as, for example, a diskette. Then, the user may direct the instant messaging client device to send the stored reputable chat log and platform configuration value quotes to the other party or parties involved with the online instant messaging conversation or to some other third party or entity, such as, for example, the district attorney's office (step 626). Further, it should be noted that the entity receiving the reputable chat log and platform configuration value quotes may perform the verification process of step 622 in addition to the instant messaging client device or instead of the instant messaging client device. The process terminates thereafter.

Thus, illustrative embodiments provide a computer implemented method, system, and computer usable program code for creating a reputable chat log. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for creating a non-repudiable chat log, the computer implemented method comprising:
   responsive to initiating a secure chat session, performing at a start of the secure chat session an initial quote of a current value of a register that is used to record measurements of each message associated with the secure chat session;
   responsive to sending or receiving a message associated with the secure chat session, measuring the message;
   responsive to measuring the message associated with the secure chat session, extending the current value of the register to record a message measurement of the message within the register and adding a content of the message to a chat log associated with the secure chat session to create an entire record of all messages associated with the secure chat session;
   performing intermediate quotes of the current value of the register at pre-determined intervals between the initial quote at the start of the secure chat session and a final quote at termination of the secure chat session; and
   responsive to terminating the secure chat session, performing the final quote of the current value of the register, re-measuring each message in the entire record of all messages associated with the secure chat session in the chat log, and comparing re-measurements of messages in the entire record of all the messages associated with the secure chat session in the chat log with the initial, intermediate, and final quotes of the current value of the register to determine whether tampering occurred with the chat log.

2. The computer implemented method of claim 1, wherein the message is one of a plurality of messages, and wherein the plurality of messages are recorded in the chat log associated with the secure chat session.

3. The computer implemented method of claim 1, further comprising:
   verifying that quotes of the current value of the register are signed;
   storing the chat log and the quotes of the current value of the register; and
   sending the chat log and the quotes of the current value of the register.

4. The computer implemented method of claim 1, wherein the secure chat session is a secure instant messaging chat session, and wherein the message is one of an incoming instant message or an outgoing instant message.

5. The computer implemented method of claim 1, wherein the message measurement is one of a plurality of message measurements, and wherein the current value of the register is extended with each recorded message measurement in the plurality of message measurements to create a sequential measurement of the secure chat session in the register.

6. The computer implemented method of claim 3, wherein the register is a platform configuration register.

7. The computer implemented method of claim 6, wherein the platform configuration register resides in a trusted platform module, and wherein the trusted platform module resides in a client device.

8. The computer implemented method of claim 7, wherein the trusted platform module signs the quotes of the current value of the register with an attestation identity key.

9. A data processing system for creating a non-repudiable chat log, comprising:
 a bus system;
 a storage device connected to the bus system, wherein the storage device includes a set of instructions; and
 a processing unit connected to the bus system, wherein the processing unit executes the set of instructions to perform at a start of a secure chat session an initial quote of a current value of a register that is used to record measurements of each message associated with the secure chat session in response to initiating the secure chat session; measure a message associated with the secure chat session in response to sending or receiving the message; extend the current value of the register to record a message measurement of the message within the register and add a content of the message to a chat log associated with the secure chat session to create an entire record of all messages associated with the secure chat session in response to measuring the message associated with the secure chat session; perform intermediate quotes of the current value of the register at pre-determined intervals between the initial quote at the start of the secure chat session and a final quote at termination of the secure chat session; and perform the final quote of the current value of the register, re-measure each message in the entire record of all messages associated with the secure chat session in the chat log, and compare re-measurements of messages in the entire record of all the messages associated with the secure chat session in the chat log with the initial, intermediate, and final quotes of the current value of the register to determine whether tampering occurred with the chat log in response to terminating the secure chat session.

10. The data processing system of claim 9, wherein the processing unit executes a further set of instructions to verify that quotes of the current value of the register are signed, store the chat log and the quotes of the current value of the register, and send the chat log and the quotes of the current value of the register.

11. The data processing system of claim 9, wherein the register is a platform configuration register.

12. The data processing system of claim 11, wherein the platform configuration register resides in a trusted platform module, and wherein the trusted platform module resides in a client device.

13. A non-signal computer readable medium having computer usable program code encoded thereon that is executable by a computer for creating a non-repudiable chat log, the computer readable storage medium comprising:
 computer usable program code configured to perform at a start of a secure chat session an initial quote of a current value of a register that is used to record measurements of each message associated with the secure chat session in response to initiating the secure chat session;
 computer usable program code configured to measure a message associated with the secure chat session in response to sending or receiving the message;
 computer usable program code configured to extend the current value of the register to record a message measurement of the message within the register and add a content of the message to a chat log associated with the secure chat session to create an entire record of all messages associated with the secure chat session in response to measuring the message associated with the secure chat session;
 computer usable program code configured to perform intermediate quotes of the current value of the register at pre-determined intervals between the initial quote at the start of the secure chat session and a final quote at termination of the secure chat session; and
 computer usable program code configured to perform the final quote of the current value of the register, re-measure each message in the entire record of all messages associated with the secure chat session in the chat log, and compare re-measurements of messages in the entire record of all the messages associated with the secure chat session in the chat log with the initial, intermediate, and final quotes of the current value of the register to determine whether tampering occurred with the chat log in response to terminating the secure chat session.

14. The non-signal computer readable medium of claim 13, wherein the message is one of a plurality of messages, and wherein the plurality of messages are recorded in the chat log associated with the secure chat session.

15. The non-signal computer readable medium of claim 13, further comprising:
 computer usable program code configured to verify that quotes of the current value of the register are signed;
 computer usable program code configured to store the chat log and the quotes of the current value of the register; and
 computer usable program code configured to send the chat log and the quotes of the current value of the register.

16. The non-signal computer readable medium of claim 13, wherein the secure chat session is a secure instant messaging chat session, and wherein the message is one of an incoming instant message or an outgoing instant message.

17. The non-signal computer readable medium of claim 15, wherein the quotes of the current value of the register are signed by a trusted platform module with an attestation identity key.

* * * * *